US010675632B2

(12) United States Patent
Stokes et al.

(10) Patent No.: US 10,675,632 B2
(45) Date of Patent: Jun. 9, 2020

(54) TIRE PROCESSING APPARATUS AND METHOD OF USE

(71) Applicants: OTR Solutions, LLC, Logan, UT (US); Robert Stokes, Porter, UT (US); Lawrence Allen, Wellsville, UT (US); Terry Shelby, Bear River City, UT (US); Craig Dopp, Preston, ID (US)

(72) Inventors: Robert Stokes, Porter, UT (US); Lawrence Allen, Wellsville, UT (US); Terry Shelby, Bear River City, UT (US); Craig Dopp, Preston, ID (US)

(73) Assignee: TMP Enterprises, LLC, North Salt Lake, UT (US)

( * ) Notice: Subject to any disclaimer, the term of this patent is extended or adjusted under 35 U.S.C. 154(b) by 279 days.

(21) Appl. No.: 15/759,216

(22) PCT Filed: Nov. 29, 2015

(86) PCT No.: PCT/US2015/062869
§ 371 (c)(1),
(2) Date: Mar. 10, 2018

(87) PCT Pub. No.: WO2017/091237
PCT Pub. Date: Jun. 1, 2017

(65) Prior Publication Data
US 2018/0250683 A1    Sep. 6, 2018

(51) Int. Cl.
*B02C 18/02* (2006.01)
*B26D 3/00* (2006.01)
(Continued)

(52) U.S. Cl.
CPC .............. *B02C 18/02* (2013.01); *B02C 18/00* (2013.01); *B23D 45/003* (2013.01); *B26D 1/16* (2013.01);
(Continued)

(58) Field of Classification Search
CPC ........ B23B 45/003; B26D 1/16; B26D 3/005; B26D 9/00; B02C 2201/04
See application file for complete search history.

(56) References Cited

U.S. PATENT DOCUMENTS 2,996,109 A * 8/1961 MacMillan ......... B29B 17/0206
157/13
3,675,706 A    7/1972 Cahill
(Continued)

*Primary Examiner* — Dung Van Nguyen
(74) *Attorney, Agent, or Firm* — Preston P. Frischknecht; Project CIP

(57) ABSTRACT

This invention relates to a tire processing apparatus for processing large used tires as are found from industrial mining applications. The present invention relates particularly to a tire processing apparatus comprising a head that is operable to move about two or more axes at a first end of a swing arm, the head further having a rasp operable to strip rubber particles from a stationary tire for use of the particles as a landscaping mulch. In various embodiments, the apparatus also comprises a head with a circular saw operable to cut a portion of the tire into a livestock trough. The invention also includes a method using the above. The system and method in its various embodiments are particularly adept at processing used tires from mining industry applications.

15 Claims, 8 Drawing Sheets

(51) Int. Cl.
  *B23D 45/00* (2006.01)
  *B02C 18/00* (2006.01)
  *B26D 1/16* (2006.01)
  *B26D 9/00* (2006.01)
(52) U.S. Cl.
  CPC .............. *B26D 3/005* (2013.01); *B26D 9/00* (2013.01); *B02C 2201/04* (2013.01)

(56) References Cited

U.S. PATENT DOCUMENTS

| | | | |
|---|---|---|---|
| 3,693,894 A | 9/1972 | Willette | |
| 3,711,909 A * | 1/1973 | Commanday | B02C 18/184 |
| | | | 407/29.12 |
| 3,877,506 A | 4/1975 | Mattox et al. | |
| 3,888,145 A | 6/1975 | Heaton et al. | |
| 3,910,337 A | 10/1975 | Pelletier | |
| 3,941,178 A * | 3/1976 | Simpson | B29D 30/54 |
| | | | 157/13 |
| 3,987,834 A | 10/1976 | Hopple et al. | |
| 4,840,316 A | 6/1989 | Barclay | |
| 4,902,313 A | 2/1990 | Penter | |
| 5,033,175 A | 7/1991 | Jensen | |
| 5,054,351 A | 10/1991 | Jolliffe et al. | |
| 5,199,337 A | 4/1993 | Parker | |
| 5,307,854 A * | 5/1994 | Brewer | B24B 5/366 |
| | | | 157/13 |
| 5,584,215 A | 12/1996 | Rundle et al. | |
| 7,101,262 B2 * | 9/2006 | Hilicus, Sr. | B29D 30/68 |
| | | | 451/340 |
| 7,975,579 B1 | 7/2011 | Pederson | |
| 8,585,843 B2 * | 11/2013 | Lindsay | B29D 30/68 |
| | | | 156/96 |
| 9,011,203 B2 * | 4/2015 | Manuel | B24B 5/366 |
| | | | 451/49 |

* cited by examiner

TIRE PROCESSING APPARATUS AND METHOD OF USE

TECHNICAL FIELD AND INDUSTRIAL APPLICABILITY OF THE INVENTION

This invention relates to a tire processing apparatus and method of use for processing large used tires as are found from industrial mining applications. The present invention relates particularly to a tire processing apparatus comprising a head that is operable to move about two or more axes at a first end of a swing arm, the head further having a rasp operable to strip rubber particles from a stationary tire for use of the particles as a landscaping mulch. In various embodiments, the apparatus also comprises a head with a circular saw operable to cut a portion of the tire into a livestock trough.

BACKGROUND OF THE INVENTION

It is estimated that in the United States alone, over 300 million scrap tires are generated annually. Tires are not desirable at landfills because of their large volume and propensity to trap methane gasses that can damage landfill liners. Moreover, incinerating tires to dispose of them results in substantial pollution. With such a staggering number of used tires, the need for recycling in an environmentally sustainable way is apparent and well known.

There are various options to recycle used tires. For example, looking again at the United States, some 30 million used tires are recycled into various ground rubber applications each year. One ground rubber application is processing used tires into landscape mulch for business, residential, public, or roadside application.

Various apparatuses in the prior art process used consumer and small commercial sized tires. However, the type and size of used tires generated from industrial mining vehicles pose unique challenges for consumer and small commercial tire recycling equipment. Specifically, vehicles in the mining industry produce outsized used tires—often up to fourteen feet in diameter and five feet wide—with tread thicknesses far thicker than those found in consumer and small commercial sized tires. The sheer size, weight, and rubber volume of these type of tires render the known art useless for effectively processing used tires into applications such as landscape mulch. Current machines are simply not designed to rasp and/or cut tires of the dimensions described above, let alone to do so dependably and reliably.

DISCLOSURE OF THE INVENTION

This invention relates to a tire processing apparatus for processing large used tires as are found from industrial mining applications. The present invention relates particularly to a tire processing apparatus comprising a head that is operable to move about two or more axes at a first end of a swing arm, the head further having a rasp operable to strip rubber particles from a stationary tire for use of the particles as a landscaping mulch. In various embodiments, the apparatus also comprises a head with a circular saw operable to cut a portion of the tire into a livestock trough. The invention also includes a method using the above. The system and method in its various embodiments are particularly adept at processing used tires from mining industry applications.

DETAILED DESCRIPTION AND MODES FOR CARRYING OUT THE INVENTION

The present invention in its various embodiments, some of which are depicted in the figures herein, is an innovative tire processing apparatus.

Figure 1:
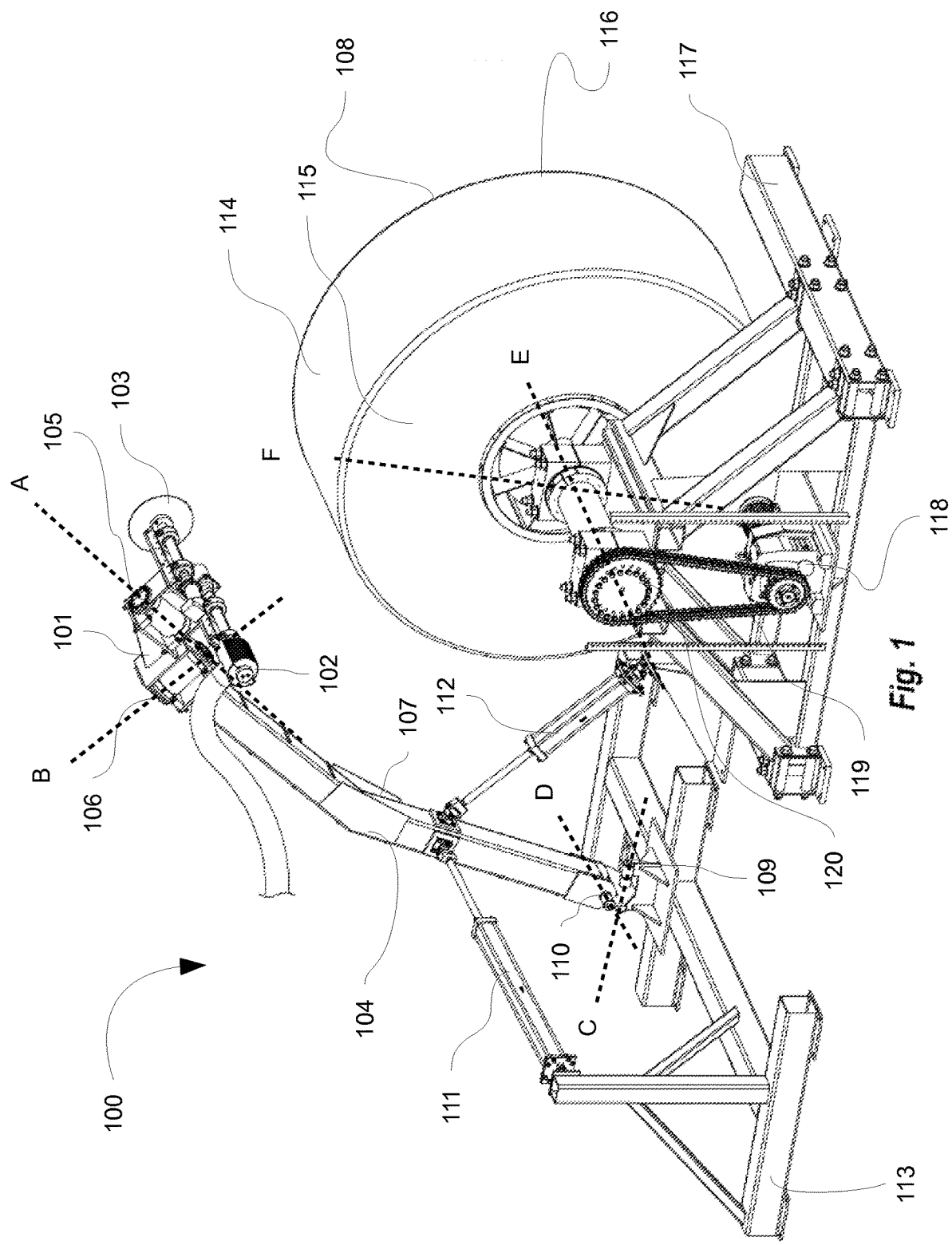
FIG. 1 is a front perspective view of one embodiment of the tire processing apparatus.

Referring now to FIG. 1, the tire processing apparatus 100 includes a head 101 with a rasp 102 and a circular saw 103. The rasp 102 and circular saw 103 may be located on opposite sides of the head 101, and be independently motor driven to, first, strip rubber particles from an up-to fourteen-foot-diameter stationary tire 108 for use of the particles as landscaping mulch, and second, to cut the tire 108 into two or more separate pieces, one of which is operable as a livestock trough. Although embodiments vary, in preferred embodiments, the rasp head is 11" tall×14" wide and the circular saw is diameter 22" or larger.

The head 101 is connected to a first, distal end of a swing arm 104. The head 101 is further operable to move about two or more axes A, B that are adjacent to the first, distal end of the swing arm 104. For example, in the illustrated embodiment, the head 101 pivots on a first, vertical axis A via a first pivot 105. The head 101 also pivots on a second, horizontal axis B via a second pivot 106.

Figure 5:
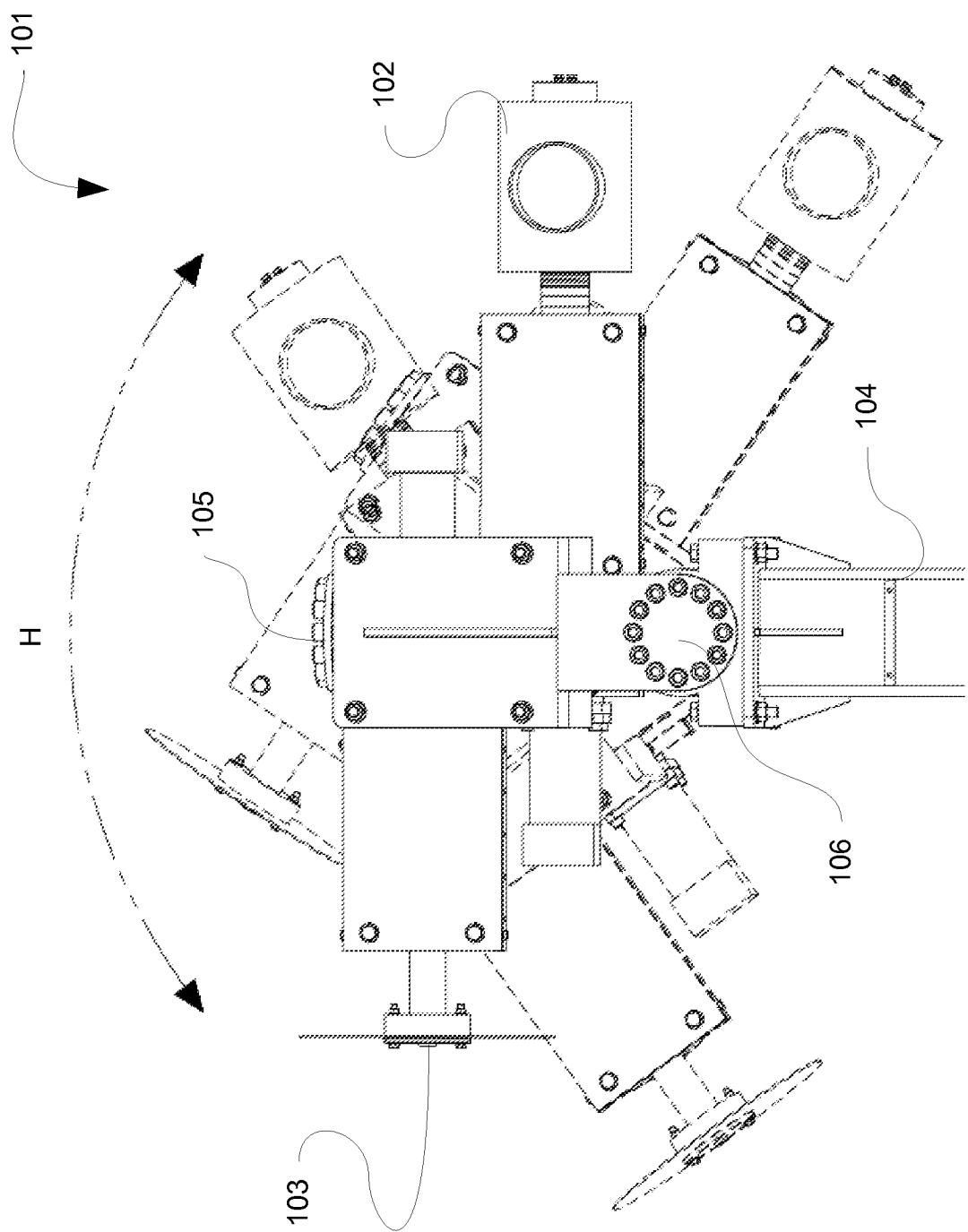
FIG. 5 is a back view of one embodiment of the head of the tire processing apparatus.
Figure 6:
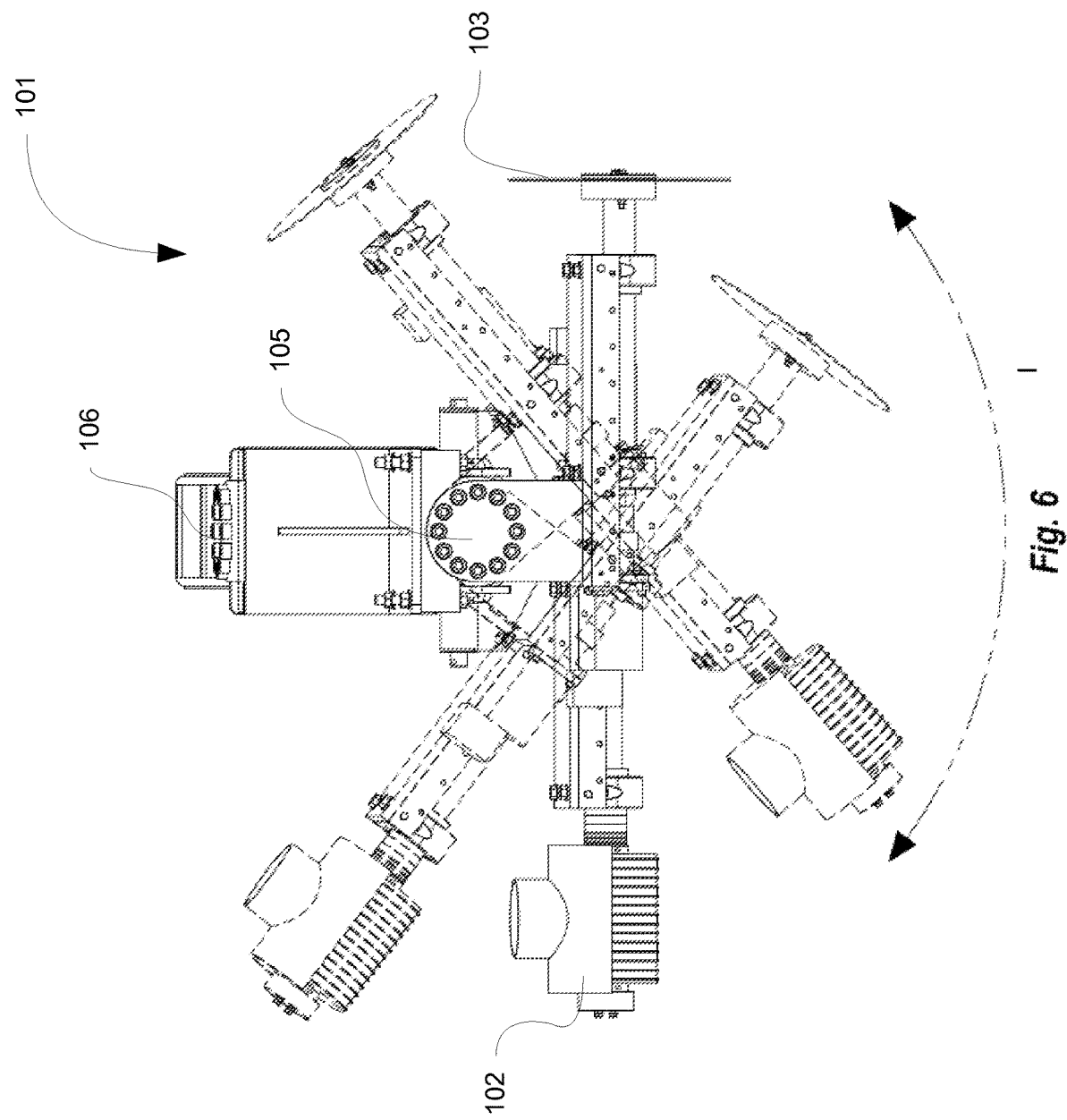
FIG. 6 is a top view of perspective view of one embodiment of the head of the tire processing apparatus.

With pivoting capability on these two or more axes, the head 101 achieves a multi-planer range of travel with respect to the stationary tire 108. More specifically, referring now to FIG. 5, the head 101 achieves range of travel H on axis B, which is approximately 180 degrees in preferred embodiments. Referring now to FIG. 6, the head 101 achieves range of travel I on axis A, which is approximately 180 degrees in preferred embodiments. Referring back to FIG. 1, pivoting operation may be facilitated by one hundred and eighty degree hydraulic actuators (not shown), or other devices, adjacent to the pivots 105, 106.

Figure 4:
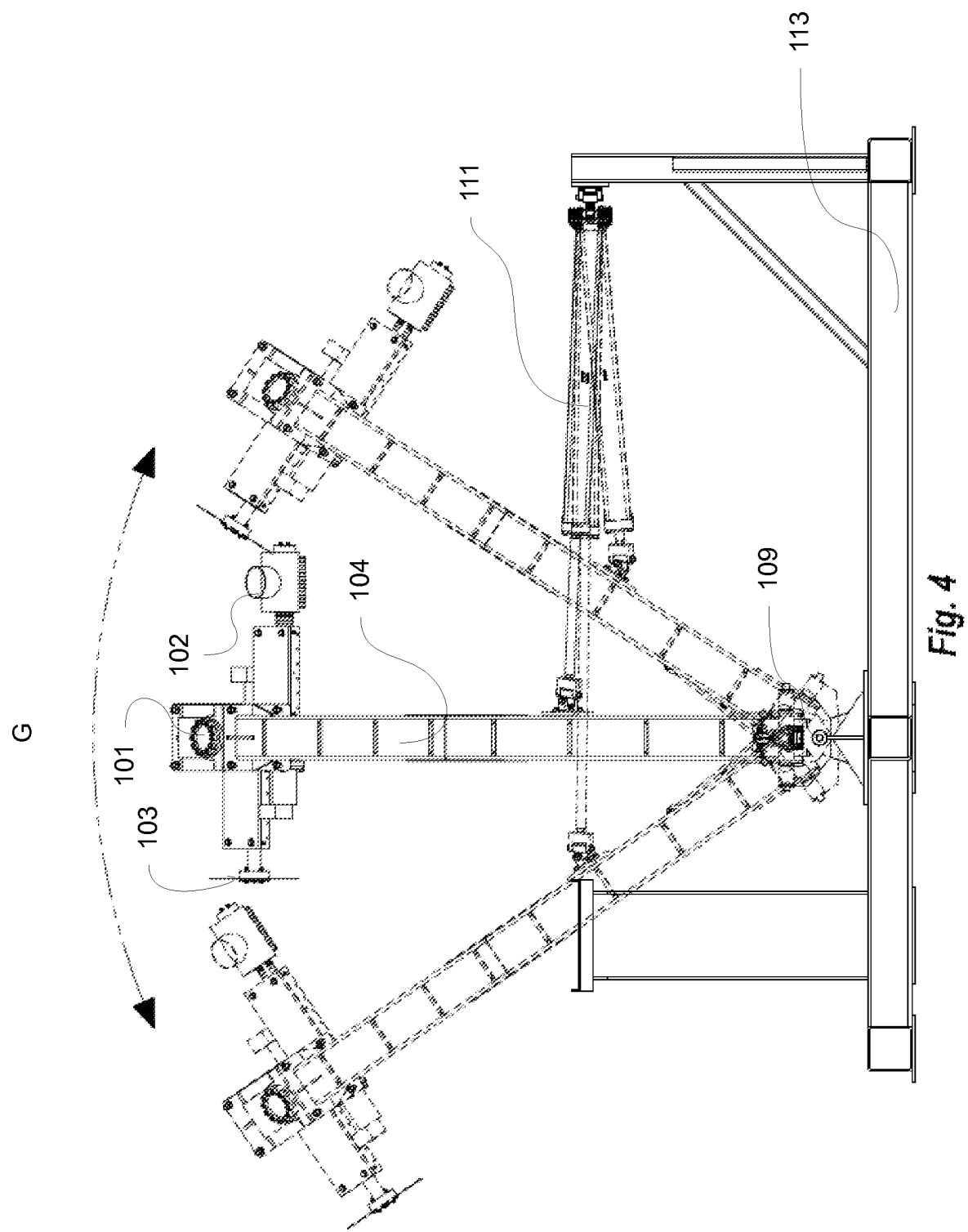
FIG. 4 is a top view of one embodiment of the tire processing apparatus.

Although embodiments may vary, the swing arm 104 may be eighteen or more feet in length and have one or more angles 107 for increasing the reach of the head 101 around the large stationary used tire 108. In the preferred embodiment, the arm angle is about 20 degrees. The swing arm 104 is operable to move about two or more axes C, D at a second, proximal end of the swing arm 104. For example, in the illustrated embodiment, the arm 104 pivots on a first, horizontal axis C via a third pivot 109. The arm 104 also pivots on a second, horizontal axis D via a fourth pivot 110. Horizontal axes C and D lie at ninety degree angles in some embodiments. Referring briefly to FIG. 4, the swing arm 104 achieves a range of travel G on axis C. In preferred embodiments, the arm can pivot approximately 60 degrees in each direction, making the total range of travel approximately 120 degrees. With pivoting capability on these two or more axes, the swing arm 104 achieves its own multi-planer range of travel with respect to the stationary tire 108, and extends the multi-planer range of travel of the head 101, discussed above.

Referring back to FIG. 1, pivoting operation of the swing arm 104 may be accomplished through one or more hydraulic arms 111, 112. In the illustrated embodiment, a first hydraulic arm 111 is connected to a first side of the swing arm 104 to pivot the swing arm 104 on axis C. A second hydraulic arm 112 is connected to a second side of the swing arm 104 to pivot the swing arm 104 on axis D. The head 101, swing arm 104, and hydraulic arms 111, 112 may all be connected to and/or placed on a swing arm base 113.

Thus configured, the head 101 and swing arm 104 are capable of reaching and processing not only the tread side 114 of the large stationary tire 108, but also the sidewalls 115, 116, all without having to reposition the stationary tire 108.

The apparatus may also include a motor driven tire base 117 for holding the tire 108 in a stationary position and rotating it with respect to the rasp 102 or saw 103 of the head 101. The tire base 117 may include a motor 118 with a chain drive 119 that turns a tire shaft 120. The tire base 117 may secure the tire 108 on a floating or unsupported arm. In various embodiments, the tire base 117 is operable to rotate the tire 108 on horizontal axis E at variable speeds and directions with respect to the rasp 102 and saw 103 of the head 101 when the apparatus 100 is in operation. In various embodiments, the various operations of the head 101, swing arm 104, hydraulic arms 111, 112, and motor driven tire base 117 are adjustable and operable by a user through remote control (see FIG. 7).

Figure 2:
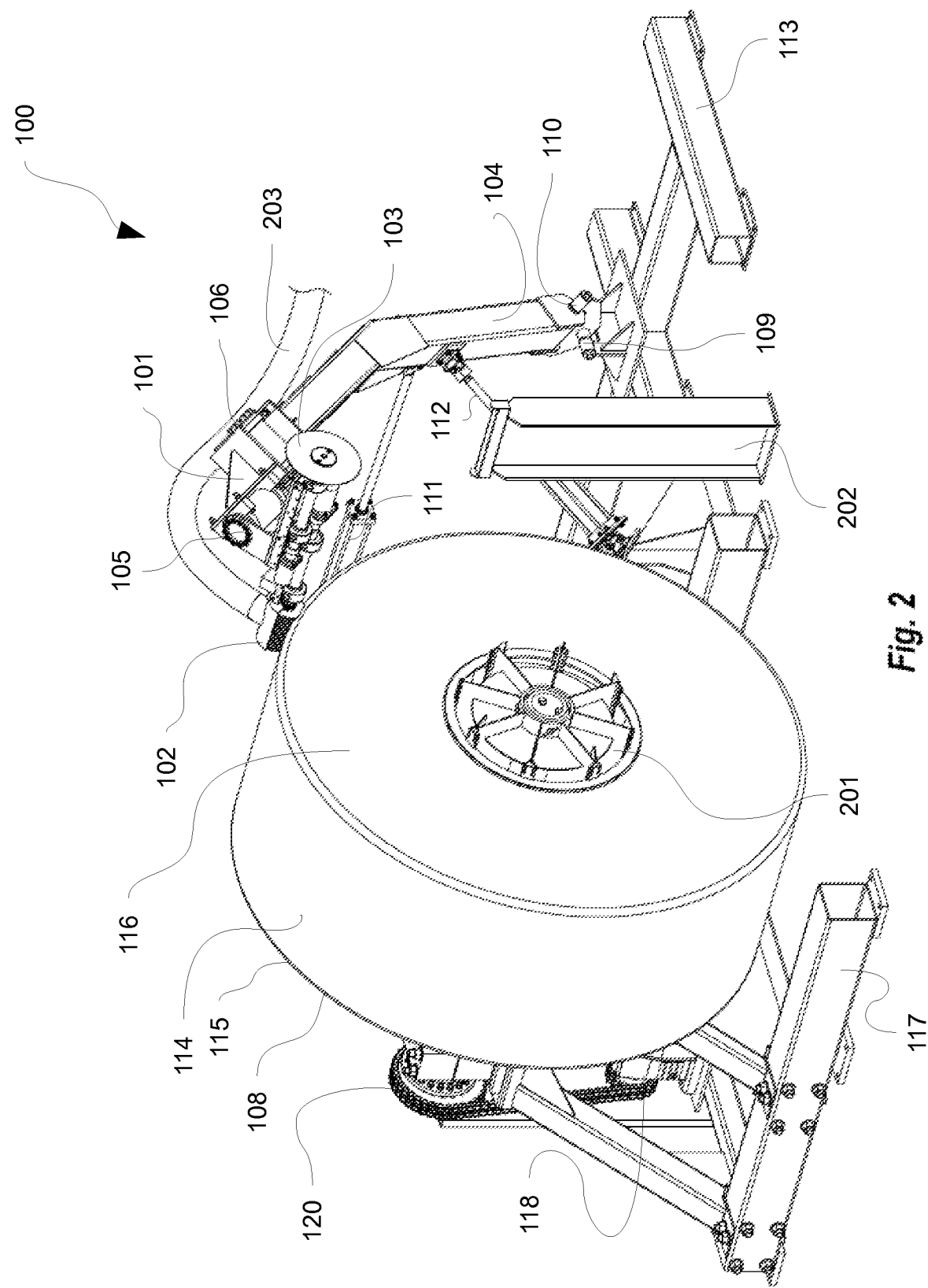
FIG. 2 is a front perspective view of one embodiment of the tire processing apparatus.

Referring now to FIG. 2, the tire processing apparatus 100 is shown in a first rasping operation. In particular, a large (again, typically between five and fourteen foot diameter) tire 108 is mounted on the tire base 117. In various embodiments of the invention, the tire base 117 has a chuck 201 which secures and holds the tire 108 onto the base 117. The invention may include chucks of various sizes and selection from among these may take place in order to accommodate tires of varying sizes.

In rasping operation, the swing arm 104 and head 101 are positioned and/or lowered onto the stationary tire 108, which is simultaneously rotated on the tire base 117. The rasp 102 is moved back and forth across the tire tread 114 and/or side walls 115, 116 to strip rubber particles for use as landscaping mulch. Depending on the embodiment, the rasp 102 generally operates at a position of between twelve and one o'clock on the tire 108. The rasp 102 may be connected to a hose 203 that removes the rubber particles to a cyclone or other separator (including air lock and rotary magnet) for sorting and/or further processing.

Figure 3:
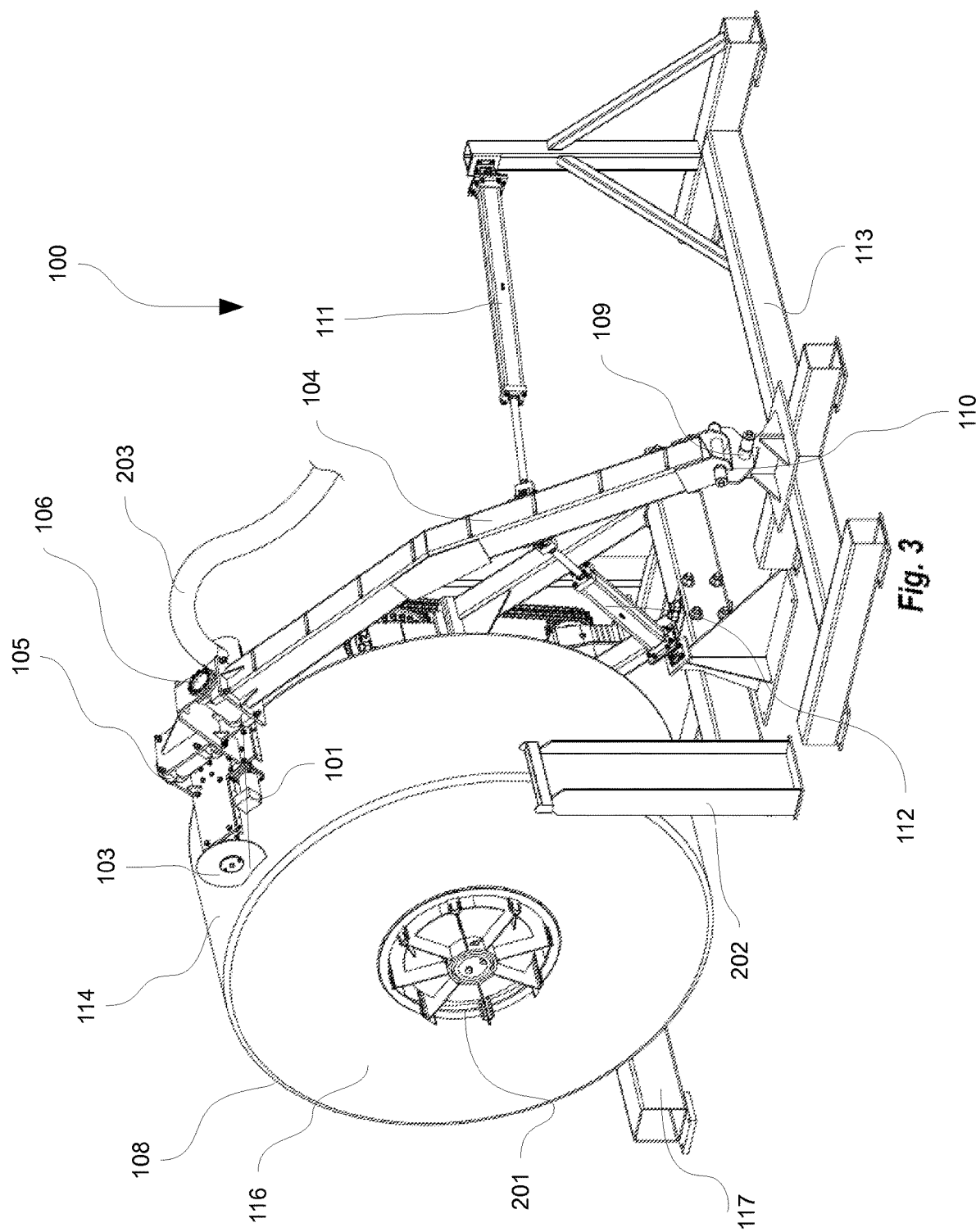
FIG. 3 is rear perspective view of one embodiment of the tire processing apparatus.

Referring now to FIG. 3, the tire processing apparatus 100 is shown in a second cutting operation. In cutting operation, the swing arm 104 and head 101 are positioned and/or lowered onto the stationary tire 108, which is simultaneously rotated on the tire base 117. The saw 103 is held in place against the tire tread 114 to cut a portion of the tire 108 into a livestock trough of typically between 24 and 30 inches in depth. In various embodiments, the saw 103 may be liquid cooled through a hose or other means (not shown).

Figure 7:
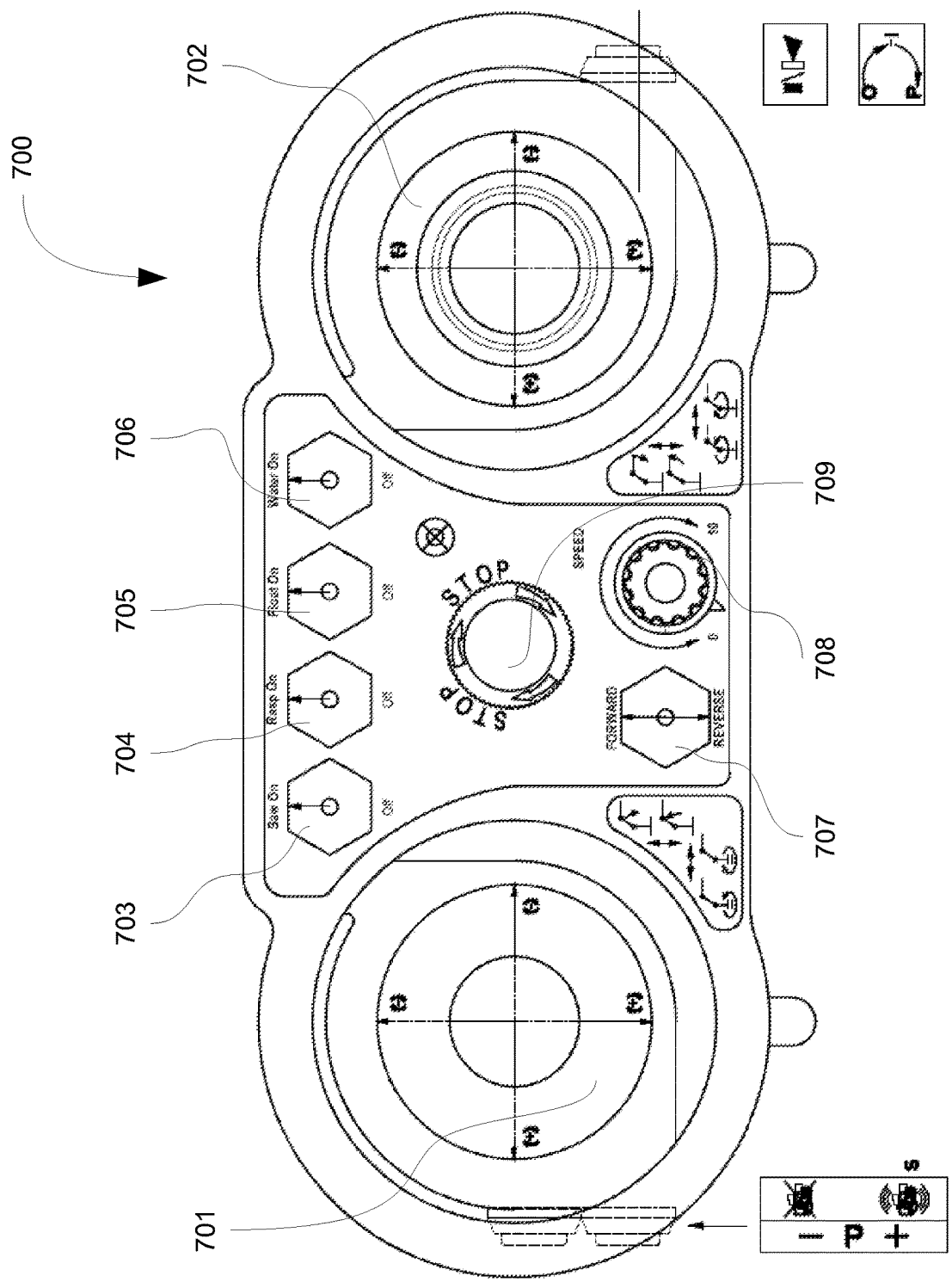
FIG. 7 is a block diagram of the computer in one embodiment of the material feeder system.

Referring now to FIG. 7, a remote control 700 for the apparatus 100 is shown. The remote control 700 may control any number of the operations of the apparatus 100, including: (1) the movement and travel of the head 701 and swing arm 702; (2) saw 703; (3) rasp 704; (4) float 705; (5) water for cooling the saw 706; (6) direction of tire base rotation 707; (7) speed of tire base rotation 708; and (8) emergency stop.

Figure 8:
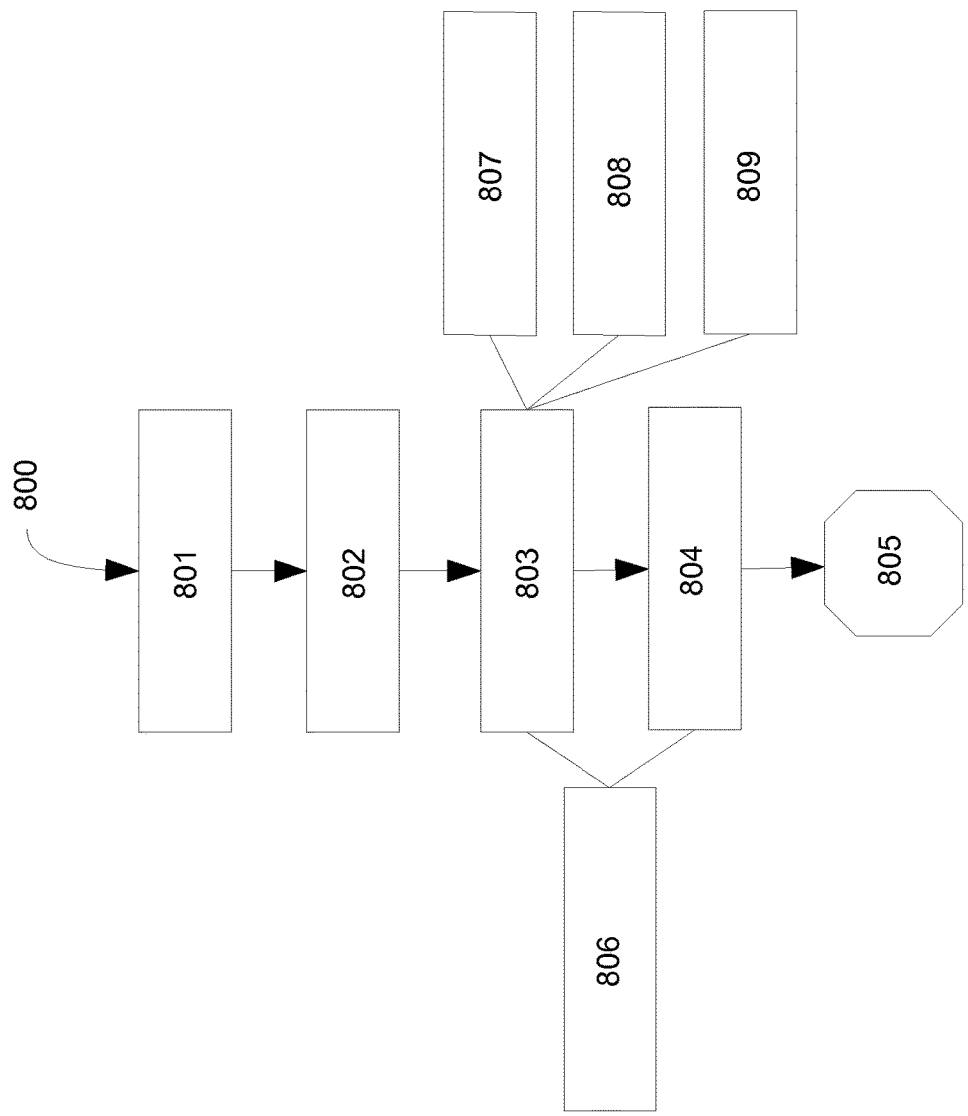
FIG. 8 is a block diagram of one embodiment of a method of using the tire processing apparatus.

Referring now to FIG. 8, a method of using the tire processing apparatus 800 is shown. A tire of between five and fourteen feet in diameter is loaded onto a stationary tire base 801. The tire is rotated on the tire base 802. Three sides of the tire are rasped to produce rubber particles for use as a landscaping mulch 803, the rasping being performed by a tire processing apparatus with a head having a rasp, the head operable to move about two or more axes at a first end of a swing arm, the swing arm operable to move about two more axes at a second end. The tire is then cut into a livestock trough 804 of between twenty four and thirty inches in depth, the cutting being performed by a tire processing apparatus with a head having a circular saw, again the head operable to move about a two or more axes at a first end of a swing arm, the swing arm operable to move about two or more axes at a second end.

Various other embodiments of a method of using the tire processing apparatus 800 include additional steps. Rasping and cutting may be performed via remote control 806. The size of rubber particles may be monitored and the speed of one or more of the motor driven tire base and rasp may be adjusted in order to achieve a particular and/or predetermined size of rubber particle 807. Identifying marks may be rasped from the tire 808. Finally, rubber particles from rasping may be collected into a material handling unit and sorted according to size 809.

The above description provides numerous specific details for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art.

It will be understood by those having skill in the art that many changes may be made to the details of the above-described embodiments without departing from the underlying principles of the invention. The scope of the present invention should, therefore, be determined only by the following claims.

We claim:

1. A tire processing apparatus, comprising:
   a head that is operable to move about two or more axes at a first end of a swing arm, the head further having a rasp operable to strip rubber particles from a stationary tire for use of the particles as a landscaping mulch, the head further having a circular saw operable to cut the tire into two or more separate pieces.

2. The tire processing apparatus of claim 1, the apparatus further capable of stripping rubber particles from a tire with a diameter that is between 5 and 13 feet.

3. The tire processing apparatus of claim 1, the circular saw further operable to cut the tire into unequally sized portions.

4. The tire processing apparatus of claim 3, the circular saw further operable to cut a portion of the tire into a livestock trough of between 24 and 30 inches in depth.

5. The tire processing apparatus of claim 1, further comprising a motor driven tire base for rotating the stationary tire with respect to the head.

6. The tire processing apparatus of claim 5, the motor driven tire base capable of rotating a tire with a diameter that is between 5 and 13 feet.

7. A tire processing apparatus, comprising:
a head with a rasp operable to strip rubber particles from a stationary tire for use as a landscaping mulch and a circular saw operable to cut the tire into two or more separate pieces the head further operable to move about a two or more axes at a first end of a swing arm, the swing arm operable to move about two or more axes at a second end, the apparatus further comprising a motor driven tire base for rotating the stationary tire with respect to the head.

8. The tire processing apparatus of claim 7, the apparatus capable of stripping rubber particles from a tire with a diameter that is between 5 and 13 feet, the apparatus further operable to cut a portion of the tire into a livestock trough of between 24 and 30 inches in depth.

9. The tire processing apparatus of claim 7, further operable by a user with a remote control.

10. The apparatus of claim 7, the motor driven tire base having variable speed for rotating the stationary tire.

11. A method for processing used tires, comprising:
loading a tire of between 5 and 14 feet in diameter onto a stationary tire base;
rotating the tire on the stationary tire base;
rasping against three sides of the tire to produce rubber particles for use as a landscaping mulch, the rasping being performed by a tire processing apparatus with a head having a rasp, the head operable to move about two or more axes at a first end of a swing arm, the swing arm operable to move about two or more axes at a second end; and
cutting the tire into a livestock trough, the cutting being performed by a tire processing apparatus with a head having a circular saw, the head operable to move about a two or more axes at a first end of a swing arm, the swing arm operable to move about two or more axes at a second end.

12. The method of claim 11 further comprising performing the rasping and cutting via remote control.

13. The method of claim 11, further comprising monitoring the size of the rubber particles created from the rasping and adjusting the speed of one or more of the motor driven tire base and rasp for achieving a particular size of rubber particle.

14. The method of claim 11, further comprising rasping off identifying marks from the tire.

15. The method of claim 11, further comprising collecting the rubber particles into a material handling unit and sorting the particles according to size.

* * * * *